Aug. 4, 1953 F. B. RYAN 2,647,758
ELEVATABLE AND TILTABLE DITCHING
AND CABLE LAYING MACHINE
Filed Oct. 16, 1950 3 Sheets-Sheet 1

INVENTOR
Francis B. Ryan
BY Cameron, Kerkam & Sutton
ATTORNEYS

Aug. 4, 1953 — F. B. RYAN — 2,647,758
ELEVATABLE AND TILTABLE DITCHING AND CABLE LAYING MACHINE
Filed Oct. 16, 1950 — 3 Sheets-Sheet 2

INVENTOR
Francis B. Ryan
BY Cameron, Kirkam & Sutton
ATTORNEYS

Aug. 4, 1953

F. B. RYAN 2,647,758

ELEVATABLE AND TILTABLE DITCHING
AND CABLE LAYING MACHINE

Filed Oct. 16, 1950

INVENTOR
Francis B. Ryan
BY
Cameron, Kirkam, & Sutton
ATTORNEYS

Patented Aug. 4, 1953

2,647,758

UNITED STATES PATENT OFFICE 2,647,758

ELEVATABLE AND TILTABLE DITCHING AND CABLE LAYING MACHINE

Francis B. Ryan, Chariton, Iowa

Application October 16, 1950, Serial No. 190,362

2 Claims. (Cl. 280—6)

This invention pertains to an improved ditching and cable laying machine particularly designed to be utilized in conjunction with my improved ditching and cable laying blade as disclosed and described in my application Serial No. 111,947, now Patent Number 2,632,265.

The improved cable laying and ditching machine structure which is the subject of the present invention contemplates improved mounting and control units for the wheels of the machine whereby the wheel units may be separately controlled independently of each other to make the machine adaptable to ditching and cable laying problems on practically any type of terrain and to enable ditching and cable laying operations to be carried out on terrain where such operations were previously conducted with extreme difficulty or on which such operations were previously impossible. It further contemplates an improved positioning of the wheels to increase the stability and efficiency of the machine.

The invention contemplates broadly the mounting of each of the wheels of the machine on a separate pivoted arm disposed toward the rear extremity of the machine, the angularity of the arms being controlled independently through the action of hydraulic cylinders to regulate the position of the wheels with respect to the main frame or body of the machine and to enable each of the wheel units to be separately angularly adjustable with respect to the main body of the machine, as required by the particular circumstances met during operation of the machine. With the present machine, for example, it is possible to ditch and lay cable under the edge of a sidewalk, along the crest of a knoll or along a slope of considerable declivity. It is further possible with the present machine to make an angular ditching cut in flat ground or a vertical cut in ground having a considerable slope. By appropriate adjustment of the wheels of the machine it is possible to make relatively sharp curves or turns during ditching and cable laying operations and it is further possible to conduct these operations in a fraction of the time previously required with the conventional type of cable laying and ditching machine.

It is therefore one object of the present invention to evolve a ditching and cable laying machine in which the wheels are separately adjustable in height with respect to the body of the machine to enable the machine to be operated successfully over substantially any type of terrain.

It is a further object of the present invention to provide such a machine which may be utilized to make an angular cut or ditch in the surface of the ground.

It is a further object of the present invention to provide an improved positioning and mounting of the wheels of the machine to increase its stability and efficiency.

It is a further object of this invention to provide improved mounting for the cutter blade of the machine with respect to the wheels thereof which will greatly increase the efficiency of the machine.

It is a further object of this invention to provide an improved mounting and control for the wheels of such a machine to enable them to be independently adjusted with respect to each other depending upon the circumstances involved.

Other and further objects of the present invention will become apparent as this specification proceeds.

Referring to the drawings.

Figure 1:
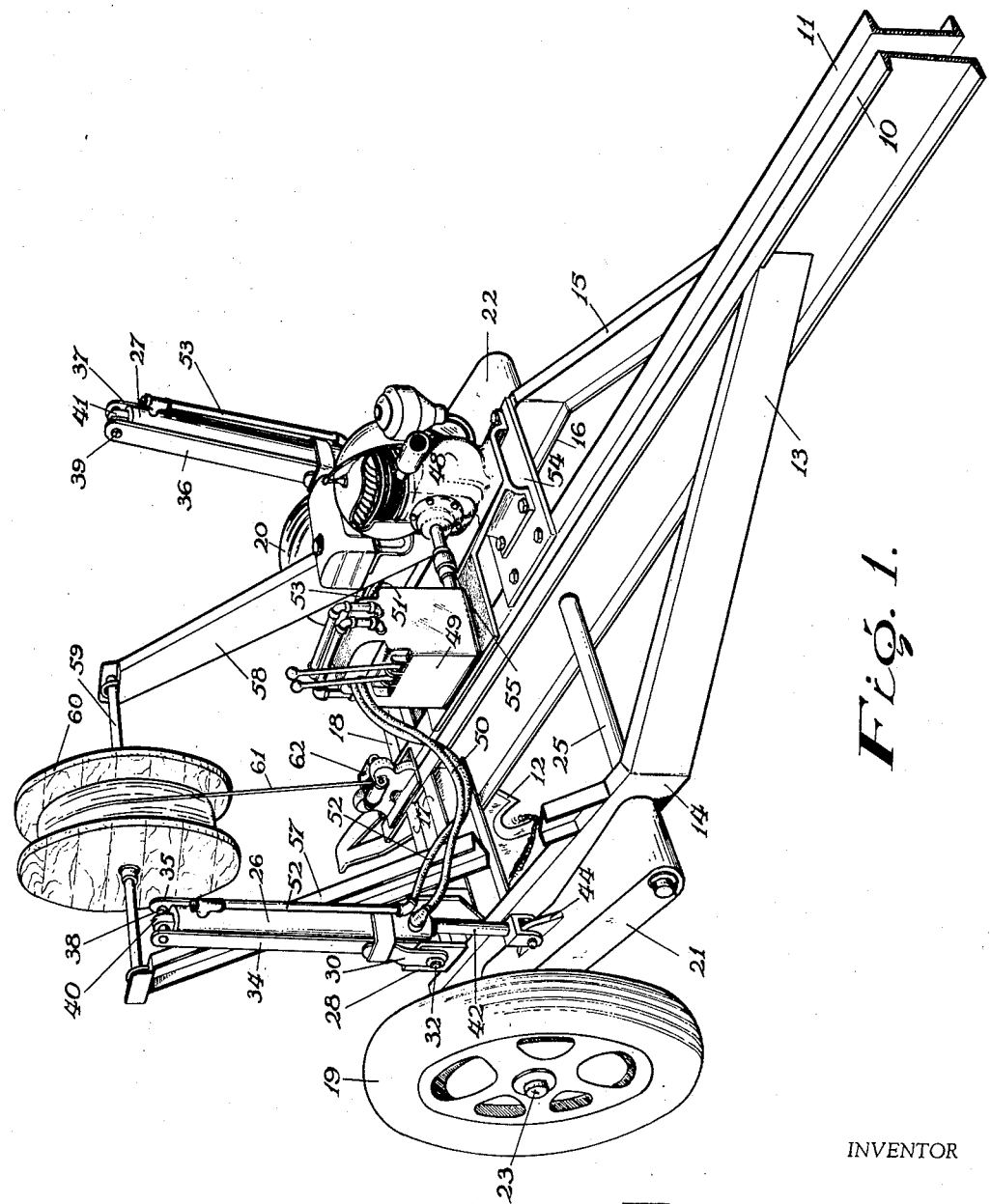
Fig. 1 is a perspective view, taken from the front and above, of the improved ditching and cable laying machine with the wheels in raised position.

In the drawings, Fig. 1, center beams 10 and 11 are shown horizontally disposed in parallel relationship with each other and are appropriately spaced apart and held in spaced parallel relationship with each other as by appropriate bolts, rivets or by other suitable means. Cutter blade 12, as shown, is preferably disposed between I beams 10 and 11 at their rearward extremity and is suitably bolted or otherwise affixed therebetween at its upper extremity in such fashion as to extend downwardly and rearwardly therefrom at an obtuse angle thereto. Angle frame beams 13, 14 and 15, 16 are shown disposed laterally and rearwardly of center beams 10 and 11 and are appropriately affixed to beams 10 and 11 respectively as by welding or bolting and extend outwardly and rearwardly therefrom to provide a lateral frame body for the machine. Angle beams 13, 14, 15 and 16 are appropriately joined to center beams 10 and 11 at their rearward extremities by frame beams 17 and 18 which are appropriately welded or otherwise affixed therebetween.

Wheels 19 and 20 are shown rotatably mounted at the rearward extremities of wheel frames 21 and 22 adjacent the rear lateral extremities of the machine frame. Wheel frames 21 and 22 carry short stub axles 23 and 24 at their rear extremities upon which wheels 19 and 20 are respectively rotatably mounted for free rotation. Wheel frames 21 and 22 are rotatably mounted at their forward extremities on main axle 25 which as shown extends through angle beam 14, center beams 10 and 11 and angle beam 16 and extends outwardly therefrom to provide a free bearing surface for the bored forward extremities of wheel frames 21 and 22, respectively, in such fashion that either of wheel frames 21 or 22 may be rotated about the extremities of axle 25 independently of the other. Suitable bearings for wheel frames 21 and 22 are provided at the extremities of axle 25 and hub caps or nuts are provided at the extremities of axle 25 and hub caps or nuts are provided at the ends of axle 25 to hold wheel frames 21 and 22 thereon. Axle 25 is preferably disposed through the machine frame at a point forward of the heaviest elements of the machine, i. e., the blade, the cable reel and uprights and the hydraulic system, as will hereinafter be discussed in detail.

Wheel frames 21 and 22 are adapted to be angularly adjusted with respect to the main frame of the machine by means of hydraulic cylinders 26 and 27 which as shown are pivotally mounted at their lower extremities adjacent the rear ends of angle beams 14 and 16 by means of double brackets 28 and 29 on which they are pivotally mounted by means of studs 30 and 31 and bolts 32 and 33. Cylinders 26 and 27 are preferably suspended between uprights 34, 35 and 36, 37 by means of pins 38, 39 and carry bored studs 40 and 41 at their upper extremities through which pins 38 and 39 are passed to maintain them in position between uprights 34—35 and 36—37.

Piston rods 42 and 43 are shown extending downwardly from the lower extremities of cylinders 26 and 27. Piston rods 42 and 43 carry pistons at their upper extremities which run in cylinders 26 and 27 and are pivotally attached to wheel frames 21 and 22 at their lower extremities by means of bored studs 44 and 45. It will be seen that upon retraction or extension of piston rods 42 and 43 cylinder units 26 and 27 are free to pivot on brackets 28 and 29 to allow clockwise or counterclockwise movement of wheel frames 21 and 22 to raise or lower wheels 19 and 20 with respect to the main frame of the vehicle.

Suitable hydraulic controls for hydraulic cylinders 26 and 27 are shown and comprise broadly a motor 48 directly coupled to a hydraulic pump 49 which carries appropriate valves $v$ and $v'$ to control the flow of hydraulic fluid to cylinders 26 and 27.

As shown, valve $v$ is preferably connected to hydraulic cylinder 26 by lines 50 and 52, line 50 leading to the bottom of cylinder 26 and line 52 leading to its top. Similarly, lines 51 and 53 lead from valve $v'$ to the bottom and top of cylinder 27. Thus, the lower lines 50 and 51 direct hydraulic fluid to cylinders 26 and 27 below the pistons of piston rods 42 and 43 and upper lines 52 and 53 direct hydraulic fluid to cylinders 26 and 27 above the pistons of piston rods 42 and 43.

When the valves are opened to allow a flow of hydraulic fluid through lower lines 50 or 51 piston rods 42 or 43 will be forced upwardly in cylinders 26 or 27 to rotate wheel frames 21 or 22 in a clockwise direction to raise wheels 19 or 20 with respect to the main frame of the vehicle. Conversely, upper lines 52 and 53 are directed to the upper extremities of cylinders 26 and 27 and when the valves are open to these lines piston rods 42 and 43 will be forced downwardly in cylinders 26 and 27 to impart a counterclockwise motion to wheel frames 21 and 22 to lower wheels 19 and 20 with respect to the main frame of the vehicle.

Lines 50—52 and 51—53 are preferably controlled by separate valves $v$ and $v'$ each having its own control lever, as shown. As has been stated these hydraulic valves are preferably so arranged that the position of wheel frames 21 and 22 may be independently adjusted depending upon the conditions of use of the machine and the wheel positions desired.

Motor 48 and hydraulic pump 49 are appropriately supported on the main frame of the vehicle as by plates 55 and 56 which are appropriately bolted or welded between center beam 11 and angle beam 16.

Uprights 57 and 58 are shown suitably affixed to the forward upper extremities of angle beams 14 and 16 and extend upwardly and rearwardly therefrom to support shaft 59, in the center of which is rotatably mounted a cable drum 60 from which a cable 61 is fed downwardly through rollers 62 whence it is directed downwardly through the tube 63 provided along the trailing edge of cutter blade 12, for laying. The operation of cutter blade 12 and its cable laying attachments is completely described in my foregoing and above-mentioned application.

Figure 3:
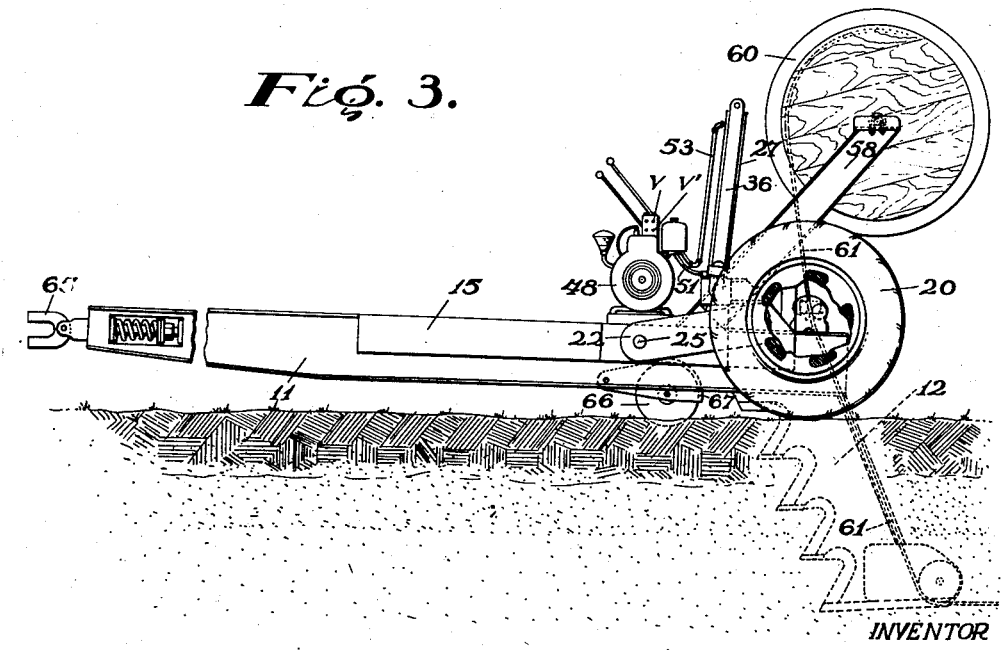
Fig. 3 is a side view of the improved machine with the wheels in completely raised position with the cutter blade in the ground in position to ditch and lay cable therein.
Figure 4:
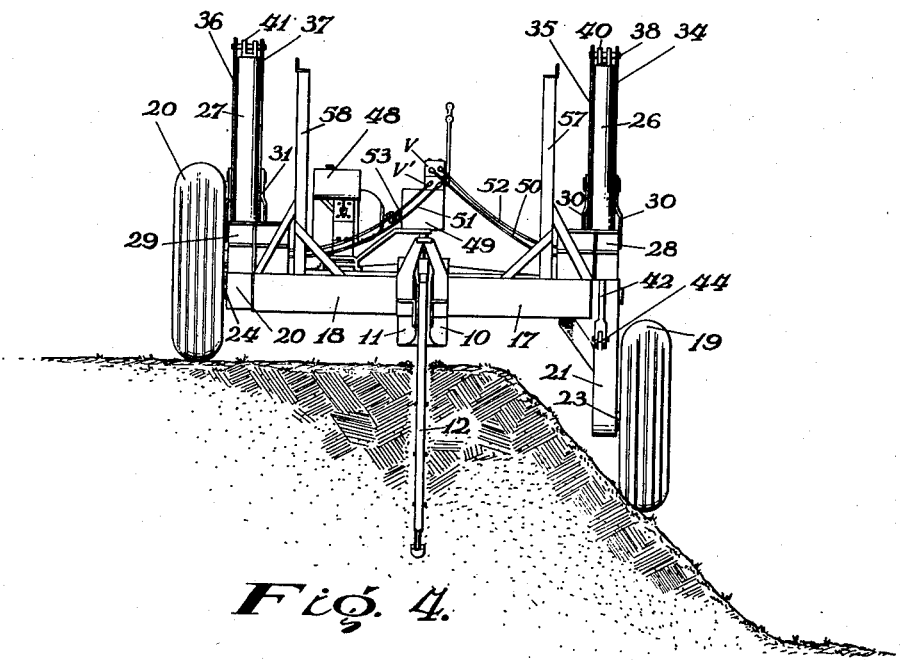
Fig. 4 is an end view of the machine taken from the rear showing the cutter blade in position in the ground and one wheel in raised position with the other in lowered position to make a vertical cut along the crest of a declivity.
Figure 5:
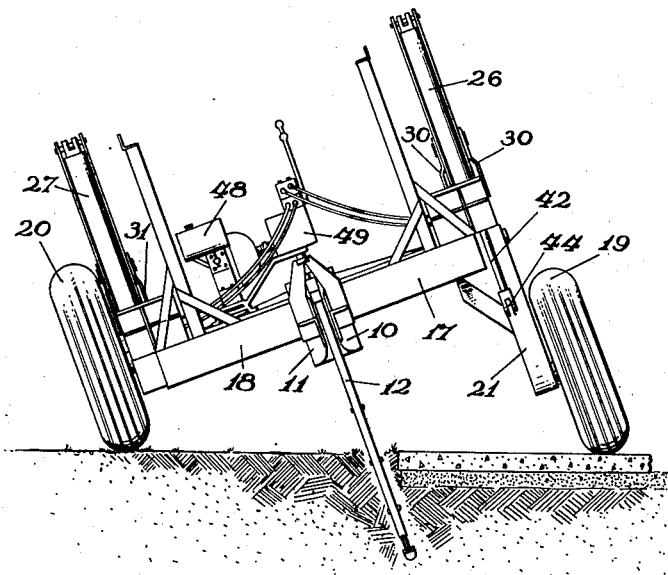
Fig. 5 is an end view of the machine taken from the rear showing the machine in position for making an angular cut in the ground on a horizontal surface, with one wheel in raised position and the other in lowered position.

As shown in Figs. 3 and 4 center beams 10 and 11 are preferably joined at their forward extremities and at that point are provided with a spring-retained pintle 65 which is adapted for attachment to a suitable tractor or truck.

Coulter 66 is preferably provided between center beams 10 and 11 ahead of the upper extremity of cutter blade 12 and is pivotally mounted therebetween as by pivoted coulter housing 67 shown in Figs. 3 and 4 of the drawing. Coulter housing 67 is preferably spring-pressed downwardly at its pivot to maintain it in contact with the surface of the ground, ahead of blade 12, regardless of the depth of cut being made. Appropriate stops are preferably provided between beams 10 and 11 limiting upward movement of coulter housing 67 to maintain it in proper position with respect to the body of the machine when blade 12 is in full lowered or cutting position.

Figure 2:
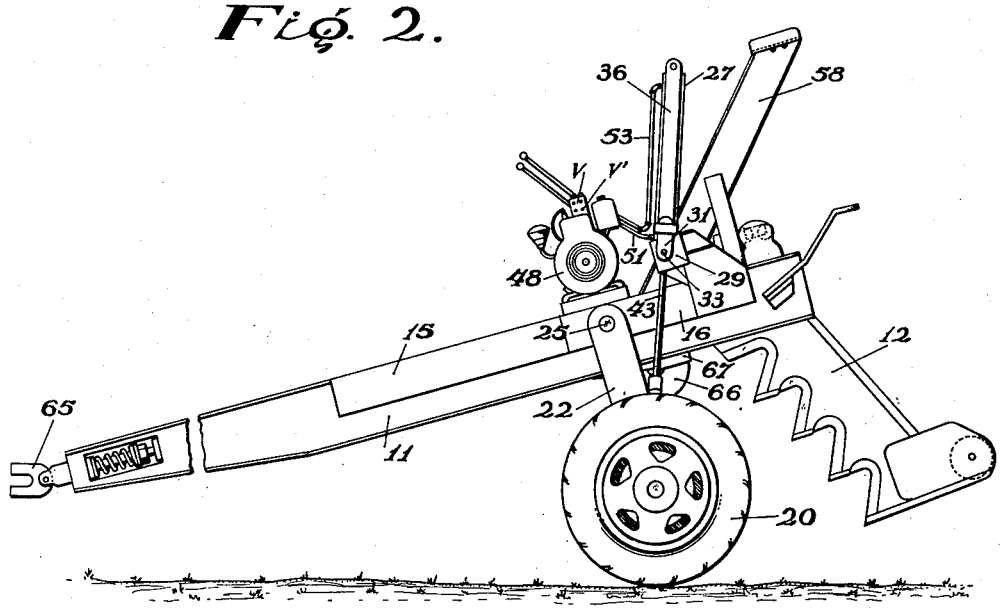
Fig. 2 is a side view of the improved machine showing both wheels in completely lowered position with the cutter blade raised above the surface of the ground, the machine being in position for transportation.

Due to the improved positioning of the axle 25 and the resultant pivoting of wheel frames 21 and 22 forward of the heaviest part of the machine at substantially its center of mass the machine is substantially "balanced" when the wheels are in their lowest position, for transportation. It will be seen, in Fig. 2, that when the wheels are down wheel frames 21 and 22 extend downwardly from the main frame at substantially an angle of 90° providing a "fulcrum" in effect and greatly reducing the pulling weight of the machine. This disposition of the wheel frames and their pivot points greatly reduces the power necessary for transporting the machine and makes it possible for it to be transported by light, low-powered vehicles at high speeds. Conversely, it will be seen from Fig. 3 that when wheel frames 21 and 22 and wheels 19 and 20 are in "raised" position for ditching and cable laying the weight of the machine falls at a point at the extreme rear of the machine between the wheels and in line with the cutter blade 12. The concentration of the mass of the machine at this point when the blade is in the ground assists greatly in holding the blade in the ground during ditching operations and greatly increases the ease of penetration of the blade. Further, due to the positioning of the wheels laterally of the blade during ditching the stability of the machine is greatly increased and the tendency of the blade to deviate from its desired path is reduced to the minimum.

It is these features of the machine which make it so highly efficient and which permit the use of a two-wheeled vehicle for the support of the cutter blade.

The operation of the improved machine will now be described in detail. When it is desired to transport the machine the ditching blade 12 is raised clear of the ground by opening upper hydraulic lines 52 and 53 whereby piston rods 42 and 43 are forced downwardly in cylinders 26 and 27 swinging wheel frames 21 and 22 in a counterclockwise direction downwardly about axle 25, lowering wheels 19 and 20 to their extreme lowered positions with wheel frames 21 and 22 extending downwardly from the main frame at substantially a 90° angle thereto. With the wheels in this position pintle 65 is attached to the towing vehicle and the machine may be transported freely and at high speed. As has hereinbefore been stated, with the wheels down the machine is substantially "in balance" on wheel frames 21 and 22, thus greatly reducing the towing weight of the machine.

When it is desired to make a ditch on level ground the valves in hydraulic pump 49 are actuated to direct hydraulic fluid through lower lines 50 and 51 whereby piston rods 42 and 43 and wheel frames 21 and 22 are appropriately raised, lowering cutter blade 12 into the desired cutting position. If it is desired to cut to the extreme depth of cutter blade 12 wheel frames 21 and 22 are swung clockwise to their extreme upward position, raising wheels 19 and 20 to their highest position and thereby lowering the cutter blade its full length into the ground. It will be noted that with cutter blade 12 in lowered position wheels 19 and 20 are disposed laterally of the sides of cutter blade 12 at the extreme rear end of the machine and that wheels 19 and 20 lie in the same lateral plane as the upper extremity of cutter blade 12. This disposition of the wheels with respect to the blade 12 imparts a great stability to the machine and provides lateral bracing for blade 12 to give to the entire combination a low center of gravity and stability. With the wheels 19 and 20 in their uppermost position and blade 12 in cutting position traction is applied to the forward end of the machine and the desired cut is made.

Where it is desired to make a vertical cut along the shoulder of a declivity, as shown in Fig. 4, the wheel which is to progress along the horizontal portion of the hill is preferably placed in completely raised position while the opposite wheel 19 is lowered as far as is necessary to maintain the frame of the machine in true horizontal position. When wheel 19 has been lowered to the desired position the valve to cylinder 26 is closed maintaining it in this position.

When it is desired to make an angular cut under the edge of a sidewalk, road or other installation on the surface of the ground the appropriate wheel is raised and the opposite wheel lowered to impart the desired angularity to main frame of the machine, thus imparting to the cutter blade the angularity desired to pentrate under the edge of the pavement or road. This angularity may be varied at will by adjusting the relative position of the wheels and the depth of the angular cut may be adjusted as desired.

The machine may be adjusted to make a cut of any desired depth by appropriately adjusting the position of the wheels with respect to the frame.

Various types of motors and pumps may be utilized in the combination, as desired, depending upon the size and weight of the machine. In the preferred embodiment of the machine which weighs approximately 4000 pounds and which is designed for use with a 36" cutter blade, a 3 H. P. motor used with a Vickers vane pump or a Hydrico gear pump has proven to be completely satisfactory and to provide sufficient hydraulic pressure to actuate the wheel frames.

It has been determined that for most ditching operations, even in rocky or hard soil, a tractor of 60 horsepower provides sufficient power for efficient operation. In extremely rocky soil or for operations through paved roads more horsepower may be required.

The cutter blade may be adjusted to make a cut from 24" to 36" depending upon the hydraulic adjustment of the wheel units. Shallower cuts may be made if desired.

The approximate weight of the present machine is 2 tons, overall width is 8', length 14' and height 7½'. This weight and these dimensions may be varied widely depending upon the ditching problem to be met and the nature of the terrain being covered.

It has been determined in actual operations that the present machine will successfully cut through extremely rocky soil without pulling out the blade. It has also been successfully used in ditching operations on macadam roads and on other types of paved highways.

Due to the novel arrangement of elements and the relation of the wheels to the cutter blade the machine cuts a narrow slot in the surface of the ground which closes behind the machine. It is thus possible to lay cable through roads and streets without interfering with traffic thereon.

The invention is susceptible of modification without departing from the spirit thereof. If desired, wheel frames 21 and 22 may be pivotally affixed at the forward extremities of side frames 14 and 16 by individual axles rather than by a single axle. The disposition of the motor and pump units may be changed at will, as may the hydraulic cylinder mountings. The fundamental concept behind the invention lies in the provision of separately controllable wheel units and in the positioning of the wheel units.

Nothing in this specification is intended to limit

What is claimed is:

1. In a machine designed primarily for the support of a ditching blade or similar tool, a main frame comprising two horizontally disposed, closely aligned parallel beams, lateral beams affixed laterally of said beams and extending outwardly and rearwardly therefrom in parallel relationship thereto at their rearward extremities, an axle extending laterally through said parallel beams and said lateral beams, horizontal and flattened wheel frames rotatably mounted over the lateral extremities of said axle bearing against said lateral beams at their inner, forward extremities and extending rearwardly at the sides of said lateral beams in parallel relation thereto, wheels rotatably mounted on axles at the lateral rear extremities of said horizontal wheel frames, hydraulic cylinder units pivotally mounted at their lower extremities on the rear upper surfaces of said lateral beams and extending upwardly therefrom, pistons and piston rods slidably operating within said hydraulic cylinder units and pivotally connected to said wheel frames adjacent their rearward extremities, control means for said hydraulic units whereby the positions of said wheels with respect to said lateral beams may be independently controlled.

2. In a machine designed primarily for the support of a ditching blade or similar tool, a main frame comprising horizontally disposed closely aligned parallel beams, lateral beams affixed to said beams adjacent their forward lateral extremities and extending outwardly and rearwardly therefrom in parallel relationship thereto at their rearward extremities, an axle extending laterally through said parallel beams and said lateral beams, horizontal, rearwardly tapered wheel frames rotatably mounted over the lateral extremities of said axle extending rearwardly at the sides of said lateral beams, wheels rotatably mounted at the lateral rear extremities of said wheel frames, hydraulic cylinder units pivotally mounted at their lower extremities on the rear, upper surfaces of said lateral beams and extending vertically therefrom, piston rods extending downwardly from said cylinder units and pivotally attached at their lower extremities to the upper, rear surfaces of said wheel frames, control means for said hydraulic units whereby the positions of said wheels with respect to said lateral beams may be independently controlled.

FRANCIS B. RYAN.

References Cited in the file of this patent

UNITED STATES PATENTS

| Number | Name | Date |
|---|---|---|
| 330,724 | Montgomery | Nov. 17, 1885 |
| 1,308,039 | Cadman | July 1, 1919 |
| 1,941,143 | Wickersham | Dec. 26, 1933 |